(12) United States Patent
Tulisalo et al.

(10) Patent No.: US 6,521,719 B1
(45) Date of Patent: Feb. 18, 2003

(54) MULTIFUNCTIONAL MACROMERS

(75) Inventors: Jukka Tulisalo, Järvenpää (FI); Mikael Skrifvars, Piteå (SE); Karri Airola, Turku (FI); Jukka Estamo, Pornainen (FI); Pertti Hietakari, Piteå (SE)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 09/937,903

(22) PCT Filed: Apr. 3, 2000

(86) PCT No.: PCT/FI00/00287

§ 371 (c)(1),
(2), (4) Date: Apr. 15, 2002

(87) PCT Pub. No.: WO00/59981

PCT Pub. Date: Oct. 12, 2000

(30) Foreign Application Priority Data

Apr. 1, 1999 (FI) .................................................. 990728

(51) Int. Cl.$^7$ .............................................. C08G 59/14
(52) U.S. Cl. ...................... 525/533; 528/271; 528/392; 528/403; 525/55; 525/329.7; 525/330.3; 525/523; 525/529; 524/717; 524/726; 524/755; 524/770
(58) Field of Search ................................. 528/271, 392, 528/403; 525/55, 329.7, 330.3, 523, 529, 530, 533; 524/717, 726, 755, 770

(56) References Cited

U.S. PATENT DOCUMENTS 4,649,082 A    3/1987    Friedlander et al.
5,214,104 A    5/1993    Wamprecht et al.

FOREIGN PATENT DOCUMENTS

| EP | A2 0 463 866 | 2/1992 |
|----|--------------|--------|
| JP | A50-092986   | 7/1975 |
| JP | A53-001284   | 1/1978 |
| JP | A3-100009    | 4/1991 |
| JP | A63-130610   | 6/1998 |
| JP | A10-306153   | 11/1998 |
| SU | 328124       | 2/1972 |
| WO | A1-9607688   | 3/1996 |

OTHER PUBLICATIONS

Davy et al., Biomaterials, vol. 19, pp. 2007–2014 (1998).
STn International, FIle Caplus, Caplus accession No. 1972:420347, Document No. 77 :20437, vol. 71 (1972).
Davy et al., Biomaterials, vol. 19, pp. 2007–2014 (1998).
STn International, FIle Caplus, Caplus accession No. 1972:420347, Document No. 77:20437, vol. 71 (1972).

*Primary Examiner*—Samuel A. Acquah
(74) *Attorney, Agent, or Firm*—Birch, Stewart, Kolasch & Birch, LLP

(57) ABSTRACT

The present invention relates to multifunctional macromers, to a method for the manufacture thereof and to their use in unsaturated polyester resins as additives to improve mechanical properties of preparations manufactured thereof. The process for the manufacture of multifunctional macromers comprises the following steps: a) reacting a polycarboxylic acid with 2 to 4 carboxylic groups, preferably 3 to 4 carboxylic groups, with glycidyl (meth)acrylate or allyl glycidyl ether, the amount of glycidyl (meth)acrylate or allyl glycidyl ether being at least one mol of glycidyl (meth)acrylate or allyl glycidyl ether per free carboxylic group of formed macromer, and b) reacting the product from step a) with an unsaturated, aromatic or aliphatic anhydride in an amount sufficient to esterify part or all of the free hydroxyl groups of the product from step a).

22 Claims, No Drawings

MULTIFUNCTIONAL MACROMERS

This application is the national phase under 35 U.S.C. § 371 of PCT International Application No. PCT/FI00/00287 which has an International filing date of Apr. 3, 2000, which designated the United States of America.

The present invention relates to multifunctional macromers, to a method for the manufacture thereof and to their use in unsaturated polyester resins as additives to improve mechanical properties of preparations manufactured thereof.

The conventional curable polyester resins generally comprise oligomers and comonomers, and oligomers usually consist of linear molecular chains. The viscosity of the resin increases significantly with increasing chain length of the oligomer. Thus large amounts of multidimensional comonomers are required for viscosity control of formulas, especially for applications such as spraying, dipping and roll coating. Traditionally used comonomers affect the curing reaction and the properties of the final product. Comonomers often have a low curing rate, they cause shrinkage of the film during curing, have high costs, limited shelf life and also many of them are volatile and toxic. The legislation in several countries covering environmental protection and occupational safety has tightened during the recent years and set limitations on emissions of volatile organic compounds (VOC), such as styrene, which is a commonly used comonomer in unsaturated polyester resins. Styrene content ranges from 35% to 50% in conventional resins. Several methods have been evaluated in order to reduce the amount of styrene in unsaturated polyester resins, and low styrene emission (LSE) resins have been developed with styrene contents below 35%. LSE resins may contain additives which lower the emissions, or they are suppressed resins, new monomer resins, resins with reduced styrene contents, high solids resins or resins where styrene is totally or partly replaced with another monomer. The most commonly used method to reduce styrene emissions is to use film forming additives, such as paraffin in the resins.

Oligomers with a highly branched structure and with a spherical shape constitute a family of polymers, which has been increasingly studied during recent years. These oligomers are referred to as hyperbranched polyesters having three dimensional molecular architecture and possessing starburst topology. Hyperbranched polyesters differ significantly from conventional linear oligomers, because the linear oligomer of sufficient molecular weight for polyester resins usually contains an entanglement of flexible molecular chains, usually only with two terminal functional groups on each molecule, while the hyperbranched polyester is a compact spherical molecule with many branches which carry a high number of terminal functional groups on each molecule. These unique features of the hyperbranched polyesters yield very interesting and special properties which make these compounds attractive and useful in several applications. The special shape yields the compounds favourable and different rheological properties, such as lower viscosity, when compared with the linear conventional oligomers. The high number of terminal functional groups, which can be modified, results in a variety of physical and chemical properties. Oligomers with a strongly branched structure can be used in applications such as catalysts, as carriers for drug substances in pharmaceutical industry, as pharmaceuticals, cosmetics, adhesives, coatings, composites, agricultural chemicals and as multifunctional crosslinking agents.

A series of hyperbranched (meth)acrylated polyesters with different number of terminal double bonds per molecule has been presented and methods for the manufacture thereof have been disclosed in the patent application WO 96/07688. This publication discloses a hyperbranched polyester of a polyol with 3 to 10 reactive hydroxyl groups and an aromatic polycarboxylic anhydride with 2 to 4 carboxyl groups, each hydroxyl group of the polyol forming an ester linkage with one anhydride group of the polycarboxylic anhydride, and further glycidyl (meth)acrylate or allyl glycidyl ether forming ester linkages with the remaining carboxyl groups of the anhydride and free hydroxyl groups is disclosed. Further, in the hyperbranched polyester, (meth) acrylic anhydride and/or an aliphatic carboxylic anhydride form ester linkages with free hydroxyl groups. The said hyperbranched polyesters can be used as resins which are curable by UV-radiation. The method for the manufacture of hyperbranched polyesters comprises reacting an aromatic polycarboxylic anhydride with a polyol with 3 to 10 reactive hydroxyl groups in the presence of an activating agent and reacting the obtained product with glycidyl (meth)acrylate or allyl glycidyl ether.

An object of the present invention is to provide new multifunctional macromers with a strongly branched structure.

A further object of the present invention is to provide multifunctional macromers which in unsaturated polyester applications can be used as additives or components to improve mechanical properties of the resins.

A further object of the invention is to provide multifunctional macromers which in unsaturated polyester applications require low amounts of multifunctional comonomer while the resins still retain a low viscosity, a high curing rate, an acceptable degree of curing and the final products manufactured thereof exhibit good mechanical properties, and the curing can be performed applying any suitable curing methods.

A further object of the invention is to provide a method for the manufacture of multifunctional macromers.

A further object of the invention is to provide polyester resins comprising multifunctional macromers.

The objects of the present invention are achieved by new multifunctional macromers with strongly branched structure, by a method for the manufacture thereof and by the use of them in polyester resins and by polyester resins comprising;

(1) A process for the manufacture of multifunctional macromers, characterized in that the process comprises the following steps:
a) reacting a polycarboxylic acid with 2 to 4 carboxylic groups, preferably 3 to 4 carboxylic groups, with glycidyl (methy)acrylate or allyl glycidyl ether, the amount of glycidyl (meth)acrylate or allyl glycidyl ether being at least one mole of glycidyl (meth) acrylate or allyl glycidyl ether per free carboxylic group of formed macromer, and b) reacting the product from step a) with an unsaturated, aromatic or aliphatic anhydride in an amount sufficient to esterify part or all of the free hydroxyl groups of the product from step a);

(2) A multifunctional macromer of a polycarboxylic acid comprising 2 to 4 reactive carboxylic groups and a glycidyl (meth)acrylate or allyl glycidyl ether forming ester linkages with the carboxylic groups of the acid, and further unsaturated, aromatic or aliphatic anhydride forming ester linkages with the free hydroxyl groups;

(3) A curable resin, characterized in that it comprises a multifunctional macromer according to item (2) above; and (4) Use of a curable resin according to item (3) above for the production of coatings, adhesives, laminates, foils, thin films and reinforced composites.

It has been found that new multifunctional macromers can be obtained and manufactured. The multifunctional macromers according to the invention can be prepared by a method which comprises reacting a polycarboxylic acid with 2 to 4, preferably 3 to 4 carboxylic groups, with a glycidyl (meth)acrylate and further reacting the obtained product with an unsaturated or aliphatic anhydride preferably (meth) acrylic anhydride or acetic anhydride.

The process is a controlled stepwise divergent method wherein the synthesis starts at the center of the multifunctional macromer. The synthesis comprises at least two reactions steps.

The process comprises the following steps:

First step a) reacting a polycarboxylic acid with 2 to 4 carboxylic groups, preferably 3 to 4 carboxylic groups, with glycidyl (meth)acrylate or allyl glycidyl ether, the amount of glycidyl (meth)acrylate or allyl glycidyl ether being at least one mole of glycidyl (meth)acrylate or allyl glycidyl ether per free carboxylic group of formed macromer, and Second step b) reacting the product from step a) with unsaturated, aromatic or aliphatic anhydride in an amount sufficient to esterify part or all of the free hydroxyl groups of the product from step a).

In the first reaction step, a polycarboxylic acid with 2 to 4, preferably 3 to 4 carboxylic groups, is allowed to react with glycidyl (meth)acrylate or allyl glycidyl ether in an amount of at least corresponding to one mol of glycidyl (meth)acrylate or allyl glycidyl ether per free carboxylic acid group of the formed macromer, preferably in an excess amount of about 10–30 weight-%. A preferred reactant is glycidyl (meth)acrylate. A preferred polycarboxylic acid is trimesic acid, pyromellitic acid or trimellitic acid. The reaction is carried out in a solvent, such as dimethyl formamide or 1-methyl-2-pyrrolidinone or a mixture thereof in the presence of an inhibitor for radical polymerization and a suitable inhibitor is hydroquinone monomethyl ether. The reaction temperature is below 100° C. preferably below 80° C. The obtained intermediate contained in the reaction mixture can be used without further purification in the following reaction step.

In the second reaction step, the hydroxyl groups of the macromer are reacted further with an anhydride, preferably an unsaturated, aromatic or aliphatic anhydride such as acetic anhydride or (meth)acrylic anhydride in an amount sufficient to esterify part or all of the free hydroxyl groups in order to prepare the desired multifunctional macromer molecules with acetyl groups or further end double bonds. The reaction is performed at a temperature below 100°, preferably below 80° C. in the presence of a solvent, such as dimethylformamide or 1-methyl-2-pyrrolidinone or a mixture of solvents. After the reaction is completed, an inhibitor, preferably benzoquinone is added and the product may optionally be dissolved in an organic solvent which is immiscible with water, such as an aromatic hydrocarbon or a halogenated hydrocarbon, suitably toluene or methylene chloride, for further processing. The reaction product may also be dissolved in styrene after the reaction is completed in order to obtain a 40–70% solution of the product in styrene. Styrene is especially favourable as the obtained solution can readily be used in unsaturated polyester resins without removal of the solvent. Other suitable solvents for the same purpose are p-methylstyrene or vinyl toluene. The styrene solution can readily be used for the manufacture of resins for composite, coating and adhesive applications.

The process according to the invention is also suitable for industrial scale manufacture. The compounds can be manufactured starting from commercially available starting materials, and the method is an easy and simple process. The new multifunctional macromers obtained are compounds with widely variable properties. The rheological and physical properties, such as viscosity and solubility can be varied depending on the desired applications of the compounds. The multifunctional macromers can be used as constituents in adhesives, coatings, composites, as agricultural chemicals, as pharmaceuticals, as carriers for substances, as cosmetics and as multifunctional cross-linking agents. They are specially suitable as additives to coatings and in unsaturated polyester resins to improve the mechanical properties of high solids unsaturated resins with a low comonomer content while still retaining good mechanical properties of the resins. Thus, styrene contents of 30% by weight or less can be used, which is clearly an advantage from an environmental point of view as the styrene emissions will be reduced. The multifunctional macromers can also be used in styrene-free unsaturated polyester resins, which are based on vinyl ether monomers. Mechanical properties of the polyester resins thus obtained can be widely modified and adjusted according to the final use of the resin. The multifunctional macromers according to the invention can be used as resins which can be cured by any suitable curing system, such as thermally initiated curing using initiators such as aliphatic azo compounds or organic pyroxides, such as benzoyl peroxide, by a redox reaction initiated curing using organic peroxides such as methylethylketone peroxide and metal salts, by photochemically initiated curing using UV-light or by radiation initiated curing by EB-radiation.

The resins can also comprise monofunctional or multifunctional comonomers or mixtures thereof and a suitable amount of monomer is 5–20 wt %. As multifunctional comonomers compounds with reactive double bonds, preferably with 1–6 methacrylate or acrylate groups can be used, and such as trimetyloylpropane trimethacrylate, hexanediol diacrylate, trimetylyol propane triallyl ether, pentaerythritol tri/tetraallylether, triallyl cyanurat, trimetyloyl propane triacrylether, pentarythritol tetraacrylether are suitable. As monofunctional comonomers vinyl aromatic comonomers, such as styrene, p-methyl styrene or vinyl toluene are suitable. Also alkyl (meth)acrylates, such as methyl (meth) acrylates may be used. The resins have lower viscosity than conventional oligomer resins and they can also be used without comonomers. The resins according to the invention may be used in many different fields such as coatings, adhesives, laminates, foils, thin films and composites.

The following examples illustrate the invention in more detail. However, they are not intended to limit the scope of the invention.

Preparation and results of analysis of multifunctional macromers

EXAMPLE 1

Step 1. Synthesis of the Intermediate TMGL-OH 130.0 ml (0.953 mol) of glycidyl methacrylate and 0.5 g of hydroquinone monomethyl ether are dissolved in 120 ml of DMF and the mixture is warmed up to 60 . . . 65° C. Then 55.0 g (0.262 mol) of trimesic acid is added in portions within 1 hour at a temperature below 75° C. The mixture is further stirred at 70 . . . 75° C. for about 10 hours until acid number titration (TAN) of the reaction mixture is <10 mg KOH/g.

The composition of the reaction mixture containing the intermediate TMGL-OH is analyzed and the structure is confirmed by GPC, $^1$HNMR and acid number titration.

Step 2. Synthesis of TMGL 250.0 g of the reaction mixture from step 1 containing TMGL-OH is warmed up to 50 . . . 65° C. Acetic anhydride (67.0 ml, 0.71 mol) is slowly added during 20 min at 50 . . . 70° C. After the addition of acetic anhydride, the reaction mixture is stirred at 68 . . . 72° C. for 3 hours. Then 400 ml of toluene is added to dissolve the product and the solution is washed with 500 ml of 10% $Na_2CO_3$ at 55 . . . 60° C. After separation of the layers, another 100 ml of toluene is added and the mixture is washed with 500 ml of water at 55 . . . 60° C. Then 0.1 g of benzoquinone is added and the product is distilled under vacuum below 70° C./30 mbar in order to remove residual water (about 10 ml) and toluene (about 500 ml) from the mixture.

Yield is 171 g of TMGL (viscous oil).

The structure of the product is confirmed by $^1$HNMR and GPC.

The chemical structure of the multifunctional macromer TMGL (mw 762) is provided below.

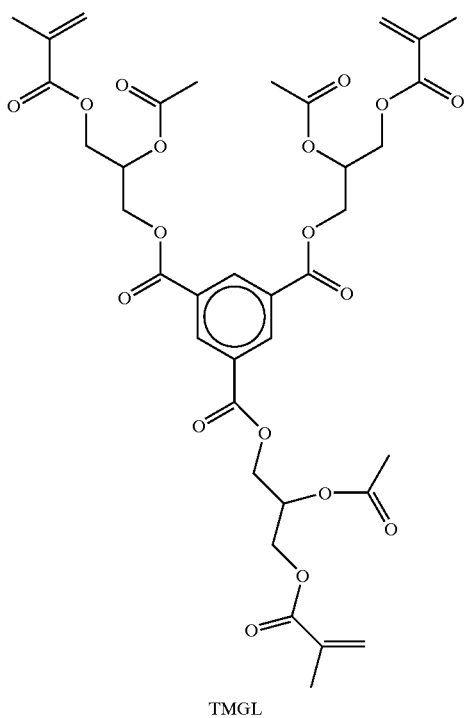

TMGL

EXAMPLE 2

Synthesis of TMMA 250.0 g of reaction mixture containing TMGL-OH obtained in Example 1, step 1 is warmed up to 50 . . . 65° C. Methacrylic anhydride (106.0 ml, 0.71 mol) is slowly added during 20 min at 50 . . . 70° C. After the addition, the mixture is stirred at 68 . . . 72° C. for 3 hours. Then 500 ml of styrene is added to dissolve the product and the solution is washed with 500 ml of 10% $Na_2CO_3$ at 55 . . . 60° C. After separation of the layers, the mixture is washed with 500 ml of water at 55 . . . 60° C. Then 0.1 g of benzoquinone is added and the product is vacuum distilled below 70° C./50 mbar to remove residual water (about 3 ml) and a part of styrene (about 400 ml) from the mixture.

Yield is 280 g of TMMA (about 60% solution in styrene).

The structure of the product is confirmed by $^1$HNMR and GPC.

The chemical structure of the multifunctional macromer TMMA (mw 840) is provided below.

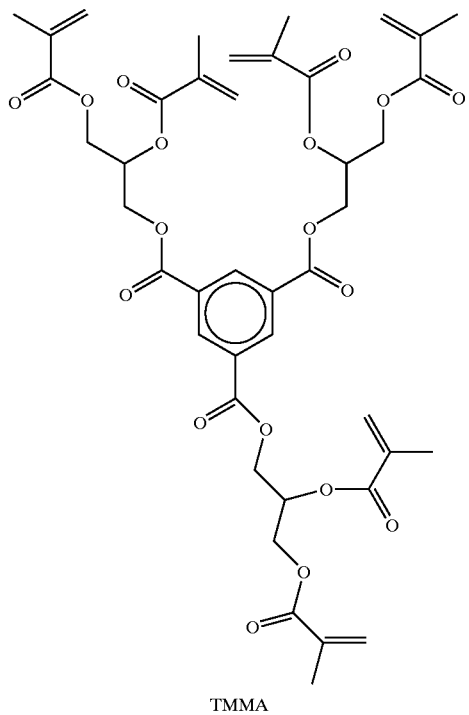

TMMA

EXAMPLE 3

Synthesis of PYGL

Step 1. Synthesis of the intermediate PYGL-OH 135.0 ml (0.989 mol) of glycidyl methacrylate and 0.5 g of hydroquinone monomethyl ether are dissolved in 120 ml of DMF and the mixture is warmed up to 60 . . . 65° C. Then 50.0 g (0.197 mol) of pyromellitic acid is added in portions within 1 hour below 75° C. The mixture is further stirred at 70 . . . 75° C. for about 10 hours until TAN of the reaction mixture is <10 mg KOH/g.

The composition of the reaction mixture containing the intermediate PYGL-OH is analyzed and the structure is confirmed by GPC, $^1$HNMR and acid number titration.

Step 2. Synthesis of the multifunctional macromer PYGL 250.0 g of the reaction mixture containing PYGL-OH is warmed up to 50 . . . 60° C. Acetic anhydride (65.0 ml, 0.69 mol) is slowly added during 20 min at 50 . . . 70° C. After the addition of acetic anhydride the reaction mixture is stirred at 68 . . . 72° C. for 3 hours. Then 400 ml of toluene is added to dissolve the product and the solution is washed with 500 ml of 10% $Na_2CO_3$ at 55 . . . 60° C. After the separation of the layers, another 100 ml of toluene is added and the mixture is washed with 500 ml of water at 55 . . . 60° C. Then 0.1 g of benzoquinone is added and the product is distilled under vacuum below 70° C./30 mbar in order to remove residual water (about 10 ml) and toluene (about 500 ml) from the mixture.

Yield is 178 g of PYGL (viscous oil).

The structure of the product is confirmed by ¹HNMR and GPC.

The chemical structure of PYGL (mw 990) is presented below.

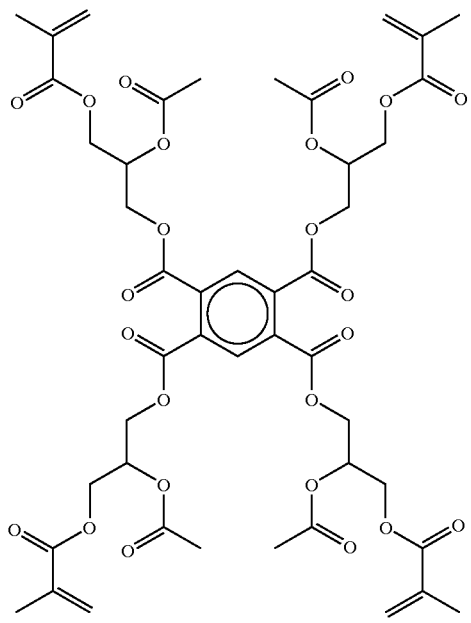

PYGL

EXAMPLE 4

Step 1. Synthesis of the Intermediate TRGL-OH 130.0 ml (0.953 mol) of glycidyl methacrylate and 0.5 g of hydroquinone monomethyl ether are dissolved in 80 ml of DMF and the mixture is warmed up to 60 . . . 65° C. Then 55.0 g (0.262 mol) of trimellitic acid is added in portions within 1 hour below 75° C. The mixture is further stirred at 70 . . . 75° C. for about 10 hours until TAN of the mixture was <10 mg KOH/g.

The obtained reaction mixture is analyzed and the structure of the intermediate is confirmed by GPC, ¹HNMR and acid number titration.

Step 2. Synthesis of TRGL 262.0 g of TRGL-OH reaction mixture is warmed up to 50 . . . 60° C. Acetic anhydride (81.0 ml, 0.86 mol) is slowly added during 30 min at 50 . . . 70° C. After addition, the mixture is stirred at 68 . . . 72° C. for 3 hours. Then 500 ml of toluene is added to dissolve the product and the solution is washed with 600 ml of 10% Na$_2$CO$_3$ at 55 . . . 60° C. After separation of the layers, another 100 ml of toluene is added and the mixture is washed with 600 ml of water at 55 . . . 60° C. Then 0.2 g of benzoquinone is added and the product is vacuum distilled below 70° C./30 mbar to remove residual water (about 5 ml) and toluene (about 600 ml) from the mixture.

Yield is 211 g of TGRL (viscous oil).

The composition of the product is confirmed by ¹HNMR and GPC.

The chemical structure of TGRL (mw 762) is presented below.

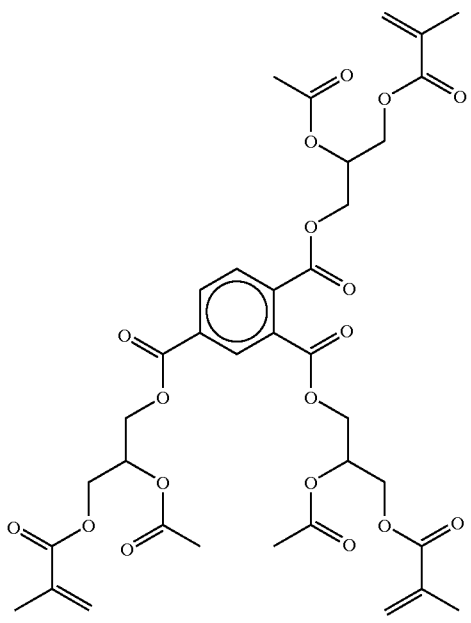

TRGL

EXAMPLE 5

Testing of Mechanical Properties

The mechanical properties of blends of multifunctional macromers and unsaturated polyester are tested from castings prepared as follows:

Resin Mixture Preparation

Resin blends are prepared by mixing the unsaturated polyester resin with various amounts of multifunctional macromers. The styrene content is 30% in all blends. The unsaturated polyester is a low molecular weight polyester made from orthophthalic anhydride, maleic anhydride and 1,2-propanediol. The amount of multifunctional macromers is 5 wt %, 10 wt % and 15 wt %. The resin blend is cured with 0.4 wt % of promoter (a mixture of cobalt octoate, dimethylaniline and methylhydroquinone) and 1 wt % of methyl ethyl ketone peroxide. As a reference, a commercial monomer trimethyloylpropane trimethacrylate is blended with the same polyester in the same way.

Preparation of Castings

The casting is prepared at room temperature using a metal frame. The surface of the frame is Teflon treated in order to prevent sticking of the resin to the metal. The outer size of the frame is 25.5×40.5 cm, the inner size is 26×21 cm. The thickness of the frame is 4 mm.

The frame is placed on a glass plate covered with Melinex (PET) foil. 400 g of resin is weighed, and air is removed with vacuum. The needed amount of peroxide is then added, and the resin is mixed without causing air-bubble formation.

The resin is poured carefully into the mold, and the mold is then covered with a Melinex film, and a glass plate. A metal plate is put on top as a weight.

The casting is left to cure overnight at room temperature.

The casting is then checked for residual stresses using two Polaroid plastic films, on a light table.

Mechanical Testing

Specimens for mechanical testing are cut using a machine saw.

After cutting the specimens are post-cured at 50° C. for 24 hours. The specimens are placed between two glass plates in an oven. The specimens are cooled slowly to room temperature (1 h) to decrease residual stresses. The tested samples are then checked between two Polaroid films for residual stresses, and the specimens with least residual stresses are selected. At least five specimens are selected.

The mechanical test is carried out using an Instron 1175, with a 5 kN load cell. The crosshead speed is 2 mm/min.

Heat Distortion Temperature

The heat distortion temperature (HDT=temperature of deflection under load) is measured from specimens cut from the castings.

The specimens are post-cured in the same way as the specimens for the mechanical testing.

The HDT value is measured in a heating bath, which is heated from 20° C. at a rate of 2° C./min. The specimen is loaded using a constant load. The temperature at which the specimen bends is registered as the HDT value.

Results of cured resins containing multifunctional macromers are provided in the following Tables 1–3.

TABLE 1

Resin containing TMGL

| | A | B | C |
|---|---|---|---|
| Amount of TMGL (wt %) | 0 | 5 | 10 |
| Tensile strength (MPa) | 53 | 45 | 52 |
| Tensile modulus (MPa) | 2899 | 2719 | 2709 |
| Tensile elongation (%) | 3.1 | 2.42 | 3.18 |
| Bending strength (MPa) | 89 | 82 | 84 |
| Bending modulus (MPa) | 2428 | 2412 | 2273 |
| Heat distortion temperature HDT (° C.) | 61 | 62 | 64 |

TABLE 2

Resin containing PYGL

| | A | B | C |
|---|---|---|---|
| Amount of PYGL (wt %) | 0 | 5 | 10 |
| Tensile strength (MPa) | 53 | 45 | 42 |
| Tensile modulus (MPa) | 2899 | 2612 | 2567 |
| Tensile elongation (%) | 3.1 | 2.4 | 2.27 |
| Bending strength (MPa) | 89 | 94 | 83 |
| Bending modulus (MPa) | 2428 | 2564 | 2394 |
| Heat distortion temperature HDT (° C.) | 61 | 64 | 65 |

TABLE 3

Reference resin containing trimethyloylpropane trimethacrylate (TMPTMA)

| | A | B | C | D |
|---|---|---|---|---|
| Amount of TMPTMA (wt %) | 0 | 5 | 10 | 15 |
| Tensile strength (MPa) | 50 | 46 | 34 | 32 |
| Tensile modulus (MPa) | 2830 | 2967 | 2961 | 3045 |
| Tensile elongation (%) | 2.4 | 2 | 1.3 | 1.2 |
| Bending (mm) | 8.4 | 7.8 | 6.8 | 6.6 |
| Bending strength (MPa) | 102 | 110 | 103 | 104 |
| Bending modulus (MPa) | 2520 | 2755 | 2858 | 2870 |
| Heat distortion temperature HDT (° C.) | 63 | 66 | 67 | 70 |

What is claimed is:

1. A process for the manufacture of multifunctional macromers, characterized in that the process comprises the following steps:
    a) reacting a polycarboxylic acid with 2 to 4 carboxylic groups with glycidyl (meth)acrylate or allyl glycidyl ether, the amount of glycidyl (meth)acrylate or allyl glycidyl ether being at least one mol of glycidyl (meth)acrylate or allyl glycidyl ether per free carboxylic group of formed macromer, and
    b) reacting the product of step a) with an unsaturated, aromatic or aliphatic anhydride in an amount sufficient to esterify part or all of the free hydroxyl groups of the product from step a).

2. A process according to claim 1, characterized in that the polycarboxylic acid is trimesic acid, pyromellitic acid or trimellitic acid.

3. A process according to claim 1 or 2, characterized in that glycidyl methacrylate is used in step a).

4. A process according to claim 1, characterized in that the reaction is carried out in step a) at a temperature below 100° C., in the presence of an organic solvent or a mixture of solvents, and in step b) at a temperature below 100° C., in the presence of an organic solvent or a mixture of solvents.

5. A process according to claim 1, characterized in that the amount of acrylate in step a) and of anhydride in step b) are in excess of the stated amount.

6. A process according to claim 1, characterized in that the reaction of step a) is performed in the presence of an inhibitor for radical polymerization and an inhibitor is used in step b).

7. A process according to claim 6, characterized in that the inhibitor in step a) is hydroquinone monomethyl ether and the inhibitor in step b) is benzoquinone.

8. A process according to claim 1, characterized in that the anhydride is acetic anhydride or (meth) acrylic anhydride.

9. A process according to claim 1, characterized in that the solvent used in step a) is dimethylformamide or 1-methyl-2-pyrrolidinone and in step b) dimethylformamide or 1-methyl-2-pyrrolidinone and after the reaction in step b) the product may optionally be dissolved in an aromatic hydrocarbon or a chlorinated hydrocarbon.

10. A multifunctional macromer of a polycarboxylic acid comprising 2 to 4 reactive carboxylic groups and a glycidyl (meth)acrylate or allyl glycidyl ether forming ester-linkages with the carboxylic groups of the acid, and further unsaturated, aromatic or aliphatic anhydride forming ester-linkages with the free hydroxyl groups.

11. A curable resin, characterized in that it comprises a multifunctional macromer according to claim 10.

12. A curable resin, characterized in that it comprises a multifunctional macromer obtained by a process according to claim 1.

13. A curable resin according to claim 11 or 12, characterized in that it further comprises a monofunctional or a multifunctional comonomer.

14. A curable resin according to claim 11, wherein the comonomer has 1–6 methacrylate or acrylate groups, or it is a vinyl aromatic monomer or a mixture thereof.

15. A curable resin according to claim 11, wherein the resin is cured by thermally initiated curing, by redox reaction initiated curing, by photochemically initiated curing or by radiation initiated curing.

16. A method of using the curable resin according to claim 11 for the production of coatings, adhesives, laminates, foils, thin films or reinforced composites.

17. The process according to claim 1, wherein the polycarboxylic acid of step (a) has 3 to 4 carboxylic groups.

18. The process according to claim 4, wherein step a) and step b) are carried out at a temperature below 80° C.

19. The process according to claim 9, wherein the product of step b) is dissolved in at least one of styrene, p-methylstyrene, vinyltoluene, toluene and methylene chloride.

20. A curable resin according to claim 12, wherein the comonomer has 1–6 methacrylate or acrylate groups, or is a vinyl aromatic monomer or a mixture thereof.

21. A curable resin according to claim 12, wherein the resin is cured by thermally initiated curing, by redox reaction initiated curing, by photochemically initiated curing or by radiation initiated curing.

22. A method of using the curable resin according to claim 12, for the production of coatings, adhesives, laminates, foils, thin films or reinforced composites.

* * * * *